(12) United States Patent
Yang et al.

(10) Patent No.: US 11,176,384 B1
(45) Date of Patent: Nov. 16, 2021

(54) APPARATUS, SYSTEM AND METHOD FOR OBJECT DETECTION AROUND VEHICLE AND APPLICATION OF SAME

(71) Applicant: XMotors.ai Inc., Mountain View, CA (US)

(72) Inventors: Fan Yang, Mountain View, CA (US); Tianshuo Zhang, Mountain View, CA (US); Cheng Lu, Mountain View, CA (US); Yandong Guo, Mountain View, CA (US)

(73) Assignee: XMOTORS.AI INC., Mountain View, CA (US)

( * ) Notice: Subject to any disclaimer, the term of this patent is extended or adjusted under 35 U.S.C. 154(b) by 0 days.

(21) Appl. No.: 17/024,806

(22) Filed: Sep. 18, 2020

(51) Int. Cl.
| | | |
|---|---|---|
| *G06K 9/00* | (2006.01) | |
| *H04N 5/225* | (2006.01) | |
| *G06T 7/10* | (2017.01) | |
| *G06T 7/73* | (2017.01) | |
| *G06N 3/08* | (2006.01) | |
| *G06K 9/62* | (2006.01) | |

(52) U.S. Cl.
CPC ..... *G06K 9/00791* (2013.01); *G06K 9/00718* (2013.01); *G06K 9/00744* (2013.01); *G06K 9/6232* (2013.01); *G06N 3/08* (2013.01); *G06T 7/10* (2017.01); *G06T 7/73* (2017.01); *H04N 5/2253* (2013.01); *G06T 2207/10016* (2013.01); *G06T 2207/20081* (2013.01); *G06T 2207/20084* (2013.01); *G06T 2207/30252* (2013.01)

(58) Field of Classification Search
CPC ........... G06K 9/00791; G06K 9/00718; G06K 9/00744; G06K 9/6232; G06T 7/10; G06T 7/73; G06T 2207/10016; G06T 2207/20081; G06T 2207/20084; G06T 2207/30252; G06N 3/08; H04N 5/2253
See application file for complete search history.

(56) References Cited

U.S. PATENT DOCUMENTS

| | | | | |
|---|---|---|---|---|
| 2009/0313193 | A1* | 12/2009 | Hawkins | G06N 3/049 706/13 |
| 2011/0225108 | A1* | 9/2011 | Hawkins | G06N 7/005 706/12 |
| 2019/0220691 | A1* | 7/2019 | Valpola | G06N 3/02 |
| 2020/0074678 | A1* | 3/2020 | Ning | G06T 7/246 |
| 2020/0372265 | A1* | 11/2020 | Ko | G06K 9/4671 |

* cited by examiner

*Primary Examiner* — Xin Jia
(74) *Attorney, Agent, or Firm* — Locke Lord LLP; Tim Tingkang Xia, Esq.

(57) ABSTRACT

An apparatus for object detection around a vehicle includes an imaging device mounted on the vehicle and a computing device. The imaging device is used to capture a video of an exterior environment of the vehicle. The computing device is used to execute a DSFPN module in order to provide a DSFPN model detector, which functions as a perception unit to process and analyze the video captured by the imaging device and to estimate a scale, a location and categories of an object. The DSFPN model detector includes a bottom-up subnet provided with auxiliary prediction heads, and a top-down subnet provided with prediction heads. When the DSFPN model detector is performed in a model training stage, both the prediction heads and the auxiliary prediction heads are used. In a detection stage, only the prediction heads are used in the DSFPN model detector, and the auxiliary prediction heads are removed.

20 Claims, 8 Drawing Sheets

APPARATUS, SYSTEM AND METHOD FOR OBJECT DETECTION AROUND VEHICLE AND APPLICATION OF SAME

FIELD OF THE INVENTION

The present invention relates generally to artificial intelligence, and more particularly to an apparatus, system and method for object detection around a vehicle and applications of the same.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Object detection around the vehicle is an important and growing field of technology for vehicle safety. By the use of a video camera mounted on a moving vehicle, video signals can be analyzed by computer vision techniques to provide advanced driver assistance and potentially life-saving support to the vehicle operator.

Following the rise of deep learning in computer vision, object detection has been greatly advanced in recent years. Numerous deep learning detectors are proposed and achieve promising results on the large-scale benchmark Microsoft Common Objects in Context (COCO) and autonomous driving dataset BDD100k. However, despite the excellent performance being obtained, the potential of the deep learning detectors has not been fully explored.

Therefore, a heretofore unaddressed need exists in the art to address the aforementioned deficiencies and inadequacies.

SUMMARY OF THE INVENTION

The present invention relates to an apparatus, system and method for object detection around a vehicle, and application of the same. Specifically, the apparatus utilizes a dually supervised feature pyramid network (DSFPN) model detector, in which the bottom-up subnet is provided with multiple additional auxiliary prediction heads, which may be used in the model training stage. In the detection stage, the auxiliary prediction heads may be removed, thus reducing the extra computational cost for model inference.

In one aspect of the invention, an apparatus for object detection around a vehicle includes: an imaging device mounted on the vehicle, configured to capture a video of an exterior environment of the vehicle, wherein the video is formed by a plurality of image frames; and a computing device having a processor and a storage device storing computer executable instructions, wherein the computer executable instructions comprise a dually supervised feature pyramid network (DSFPN) module that, when being executed by the processor, causes the processor to provide a DSFPN model detector to process and analyze the video captured by the imaging device and to estimate a scale, a location and categories of at least one object. In certain embodiments, the DSFPN model detector comprises a bottom-up subnet provided with a plurality of auxiliary prediction heads, and a top-down subnet provided with a plurality of prediction heads. The DSFPN model detector is performed in a model training stage and a detection stage. Both the prediction heads and the auxiliary prediction heads are used in the model training stage, and the prediction heads are used and the auxiliary prediction heads are removed in the detection stage.

In one embodiment, the imaging device is a camera or an image array sensor unit.

In one embodiment, each of the auxiliary prediction heads and the prediction heads comprise detection heads, and the DSFPN module comprises: a feature extraction module, configured to provide a set of convolutional networks forming the bottom-up subnet and the top-down subnet, and to generate, by the set of convolutional networks, a plurality of levels of features by an inherent hierarchy from the image frames of the video; an object hypothesis generation module, configured to generate the scale and the location of the at least one object based on the levels of features represented by a plurality of class-agnostic bounding boxes; and an object detection and segmentation module, configured to predict the categories of the at least one object in the bounding boxes, to refine the scale and the location of the at least one object in the bounding boxes, and to estimate extension of the at least one object.

In one embodiment, the detection heads of the auxiliary prediction heads are $D^k_{bu}(f^k_{bu}, B_k)$, and the detection heads of the prediction heads are $D^k_{td}(f^k_{td}, B_k)$, wherein $B_k$ represents the bounding boxes of a k-th level of the levels of features, and $f^k$ represents feature maps of the k-th level of the levels of features; wherein in the model training stage, a predicted detection of the at least one object is:

$$D=\{D^k_{td}, D^k_{bu}|k=1,2\ldots,M\}$$

and in the detection stage, the predicted detection of the at least one object is:

$$D=\{D^k_{td}|k=1,2,\ldots,M\}.$$

In one embodiment, each of the auxiliary prediction heads and the prediction heads further comprise segmentation heads, and the extension of the at least one object estimated by the object detection and segmentation module comprises segmentation of the at least one object.

In one embodiment, the segmentation heads of the auxiliary prediction heads are $S^k_{bu}(f^k_{bu}, B_k)$, and the segmentation heads of the prediction heads are $S^k_{td}(f^k, B_k)$, wherein $B_k$ represents the bounding boxes of a k-th level of the levels of features, and $f^k$ represents feature maps of the k-th level of the levels of features; wherein in the model training stage, a predicted segmentation of the at least one object is:

$$S=\{S^k_{td}, S^k_{bu}|k=1,2,\ldots,M\}$$

and in the detection stage, the predicted segmentation of the at least one object is:

$$S=\{S^k_{td}|k=1,2,\ldots,M\}.$$

In one embodiment, the DSFPN model detector is two-stage DSFPN detector configured to adopt a Faster Region-based Convolutional Neural Network (R-CNN) algorithm or a Mask-R-CNN algorithm to perform dual supervision. In one embodiment, the two-stage DSFPN detector is configured to adopt the Faster R-CNN, and a final loss $L_{final}$ of the two-stage DSFPN detector is:

$$L_{final}=\alpha_1 L(D_{gt}, D0)+\alpha_2 L(D_{gt}, D1)+\alpha_3 L(S_{gt}, S0)+\alpha_4 L(S_{gt}, S1),$$

wherein $D_{gt}$ and $S_{gt}$ represent ground truth of corresponding detection and segmentation, L(D,·) and L(S,·) are detection and segmentation loss functions, and $\alpha_1$, $\alpha_2$, $\alpha_3$, $\alpha_4$ are weights for each loss.

In one embodiment, the DSFPN model detector is multi-stage DSFPN detector configured to adopt a Cascade Region-based Convolutional Neural Network (R-CNN) algorithm or a Cascade Mask-R-CNN algorithm to perform dual supervision. In one embodiment, the multi-stage DSFPN detector is configured to adopt the Cascade R-CNN, and a final loss $L_{final}$ of the multi-stage DSFPN detector is:

$$L_{final} = \alpha_1 L(D_{gt}, D0) + \alpha_2 L(S_{gt}, S0) + \alpha_3 L(ST_{gt}, ST) + \sum_{i=1}^{T} \alpha_{si} L(Di_{gt}, Di),$$

wherein i represents an index of a plurality of prediction stages on the top-down subnet, T represents a total number of the prediction stages, ST represents segmentation predictions at a last stage of the prediction stages, $ST_{gt}$ represents a corresponding ground truth of the last stage, and its corresponding ground truth; Di represents detections at a stage i of the prediction stages, $Di_{gt}$ represents a corresponding ground truth at the stage i; L(D,·) and L(S,·) are detection and segmentation loss functions; and $\alpha_1$, $\alpha_2$, $\alpha_3$, $\alpha_{si}$ are weights of each prediction head.

Another aspect of the invention relates to a vehicle having an object detection system, in which the object detection system comprises the apparatus as described above.

In a yet another aspect of the invention, a method for performing object detection around a vehicle includes: providing, by executing a dually supervised feature pyramid network (DSFPN) module on a computing device, a DSFPN model detector, wherein the DSFPN model detector comprises a bottom-up subnet provided with a plurality of auxiliary prediction heads, and a top-down subnet provided with a plurality of prediction heads; performing training of the DSFPN model detector in a model training stage, wherein both the prediction heads and the auxiliary prediction heads are used in the model training stage; and performing object detection in a detection stage using the trained DSFPN model by: capturing, by an imaging device mounted on the vehicle, a video of an exterior environment of the vehicle; and processing and analyzing, by the trained DSFPN model, the video to estimate a scale, a location and categories of at least one object in the video, wherein the prediction heads are used, and the auxiliary prediction heads are removed in the detection stage.

A further aspect of the invention relates to a non-transitory tangible computer-readable medium storing computer executable instructions which, when executed by one or more processors, cause the method as described above to be performed.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, the phrase at least one of A, B, and C should be construed to mean a logical (A or B or C), using a non-exclusive logical OR. As used herein, the term "and/or" includes any and all combinations of one or more of the associated listed items.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The terms chip or computer chip, as used herein, generally refers to a hardware electronic component, and may refer to or include a small electronic circuit unit, also known as an integrated circuit (IC), or a combination of electronic circuits or ICs.

As used herein, the term microcontroller unit or its acronym MCU generally refers to a small computer on a single IC chip that can execute programs for controlling other devices or machines. A microcontroller unit contains one or more CPUs (processor cores) along with memory and programmable input/output (I/O) peripherals, and is usually designed for embedded applications.

The term interface, as used herein, generally refers to a communication tool or means at a point of interaction between components for performing wired or wireless data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term code, as used herein, may include software, firmware, and/or microcode, and may refer to programs, routines, functions, classes, and/or objects. Some or all code from multiple modules may be executed using a single (shared) processor. In addition, some or all code from multiple modules may be stored by a single (shared) memory. Further, some or all code from a single module may be executed using a group of processors. Moreover, some or all code from a single module may be stored using a group of memories.

The apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

As discussed above, numerous deep learning detectors have been proposed in recent years and have achieved promising results. In general, these deep learning detectors can be categorized into two types: one-stage model and two-stage model. Compared with one-stage approaches, two-stage detection models usually include three components: backbone network, region proposal head and detection head. Given object proposals, a feature pyramid architecture such as the feature pyramid network (FPN) is often adopted as the backbone network in the two-stage detectors. After that, a detection head is attached to the backbone in a lateral connect manner for achieving object localization and classification. As a natural extension, this framework has also been widely utilized for instance segmentation by adding segmentation heads.

Despite excellent performance obtained by this pyramid architecture, its potential has not been fully explored, owing to the insufficient utilization of supervision information. The reasons for the insufficient utilization can be summarized into two aspects: gradient degradation in feature pyramid and task inconsistency in detection head. In particular, the feature pyramid architecture is composed of two components: a bottom-up subnet and a top-down subnet. The prediction heads are mounted on top-down subnet. This may lead to the inadequate training of bottom-up subnet due to the presence of gradients degradation. Consequently, the top-down feature pyramid, which is composed of features from bottom-up counterpart, has a shortage of representation capability. Further, the detection and segmentation performance are not saturated under feature pyramid architecture.

The task inconsistency is an inherent problem in the current structure of the detection head, which is constructed by two weights shared sibling subnets for classification and regression, respectively. This structure limits the ability of the head to utilize supervision information. Specifically, the sibling subnets deal with the two inconsistent tasks (classification and regression) with shared fully-connected (FC) layers, resulting in sub-optimal solutions for each one. Thus, in feature space the tangled supervision information in the two tasks cannot be effectively leveraged to facilitate the feature learning in the feature pyramid. As a consequence, the detection performance is seriously under-explored.

Addressing the aforementioned issues, certain aspects of the present invention relates to a novel supervised learning strategy for the FPN, which is the dually supervised FPN (DSFPN). The DSFPN is embodied by mounting extra prediction heads (i.e., detection or segmentation) on the bottom-up layers through lateral connection. This design strategy encourages the supervision signal to directly propagate to the bottom-up feature pyramid, so as to strengthen supervision information for the feature learning in it. Moreover, the prediction heads on the bottom-up subnet can serve as a regularization term to promote the model training. In the test phase, the auxiliary prediction heads are discarded, thus no extra computational cost is needed for model inference. In DSFPN, the classification and regression subnets are decoupled to enhance the capacity of detection head to handle the task inconsistency, i.e., classification v.s. regression. Specifically, the decoupling increases the capacity of the heads such that the supervision information can be fully exploited to a certain extent to strengthen the guidance of feature learning in the pyramid architecture.

Figure 1:
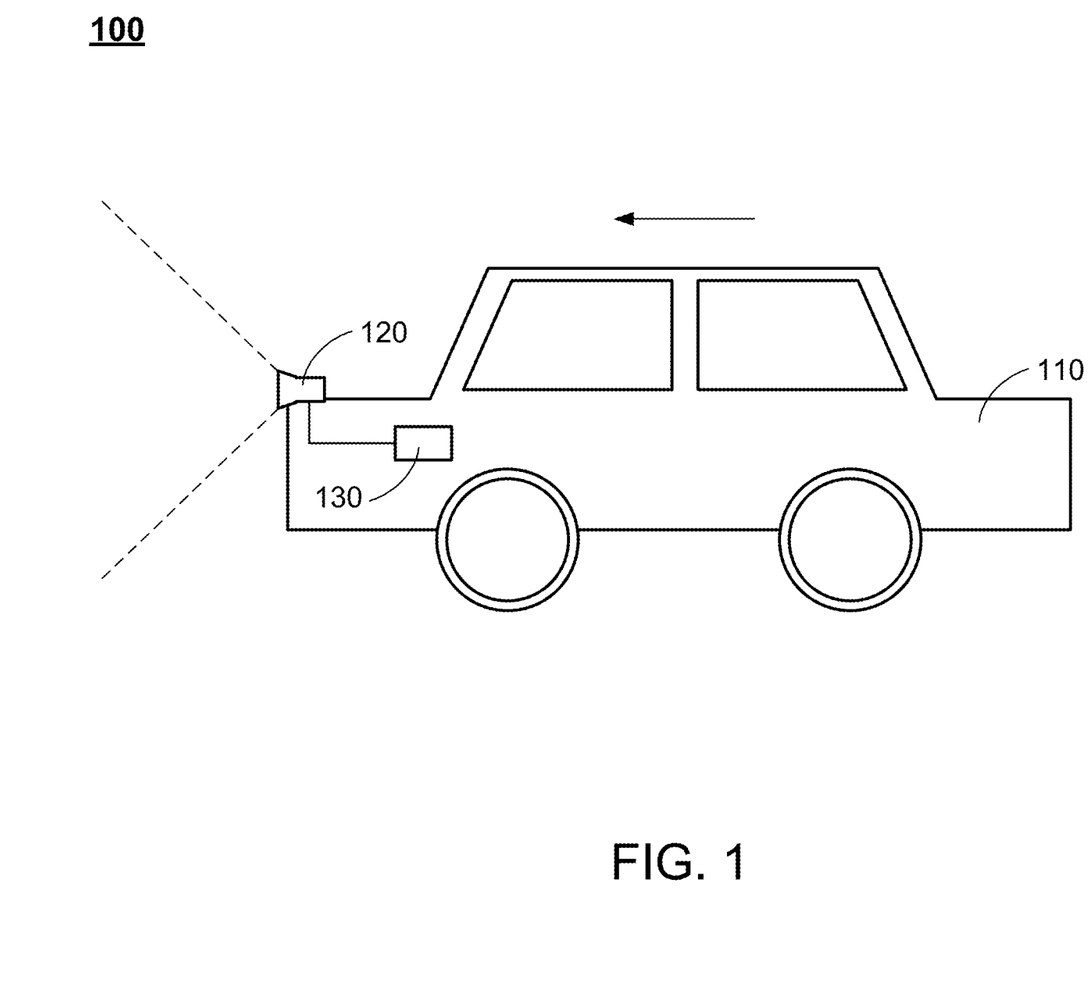
FIG. 1 shows schematically an overall architecture of a vehicle having an apparatus for object detection according to one embodiment of the invention.

One aspect of the invention relates to an apparatus for object detection around a vehicle. FIG. 1 shows schematically an overall architecture of a vehicle having an apparatus for object detection according to one embodiment of the invention. As shown in FIG. 1, the vehicle 100 has a body 110 and an apparatus for object detection disposed in the vehicle body 110, and the apparatus includes an imaging device 120 and a computing device 130 communicatively connected to the imaging device 120. Specifically, the vehicle 100 as shown in FIG. 1 is a car, which is moving forward (i.e., toward the left side of FIG. 1). In certain embodiment, the vehicle 100 may be a car, a train, a ship, an aircraft, a shuttle, or other types of vehicles. In certain embodiments, the communication between the computing device 130 and the imaging device 120 may be implemented by wired and/or wireless communication.

The imaging device 120 is used to capture a video of an exterior environment of the vehicle 100. In certain embodiments, the imaging device 120 is an image capturing device, such as camera or an image array sensor unit. As shown in FIG. 1, the imaging device 120 is disposed at the front side of the vehicle 100. In certain embodiments, the imaging device 120 can be disposed at any location of the vehicle 100 to capture the video of the exterior environment. In one embodiments, multiple imaging devices 120 may be provided to capture a video of the exterior environment surrounding the vehicle 100.

The computing device 130 functions as a perception unit of the apparatus, which is used to perform object detection by processing and analyzing the video captured by the imaging device 120. Specifically, the video captured by the imaging device 120 may include multiple image frames, and the computing device 130 is used to process and analyze each of the image frames of the video, and to recognize the features of one or more objects in the image frames, including the location, scale and categories of each of the objects. In certain embodiment, the computing device 130 may be an in-vehicle computer, such as the built-in electronic control unit (ECU) of the vehicle 100. Alternatively, in certain embodiments, the computing device 130 may be an individual computing device or control unit which runs independently and separately from the existing ECU of the vehicle 100. In certain embodiments, the computing device 130 may be a general purpose computer being provided with the necessary hardware and/or software components to perform object detection, or may be a specialized computer or controller specifically designed and configured to perform object detection.

Figure 2A:
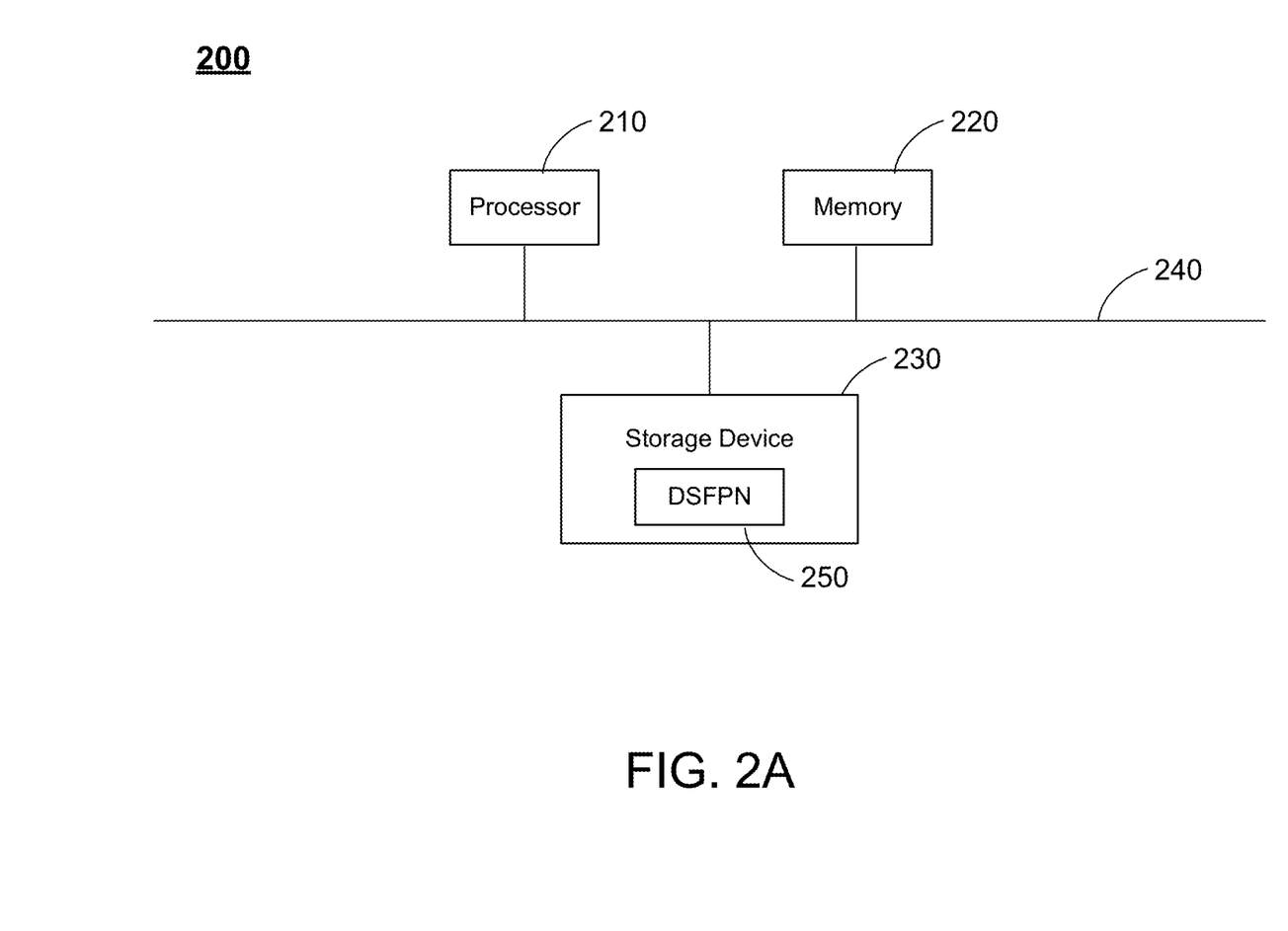
FIG. 2A shows schematically a computing device of the apparatus for object detection according to one embodiment of the invention.

FIG. 2A shows schematically a computing device of the apparatus for object detection according to one embodiment of the invention. Specifically, the computing device 200 as shown in FIG. 2 is used as the computing device 130 of the apparatus for object detection as shown in FIG. 1. As shown in FIG. 2, the computing device 200 includes a processor 210, a memory 220, and a storage device 230, and a bus 240 interconnecting the processor 210, the memory 220 and the storage device 230. In certain embodiments, the computing device 200 may include necessary hardware and/or software components (not shown) to perform its corresponding tasks. Examples of these hardware and/or software components may include, but not limited to, other required memory modules, interfaces, buses, Input/Output (I/O) modules and peripheral devices, and details thereof are not elaborated herein.

The processor 210 controls operation of the computing device 200, which may be used to execute any computer executable code or instructions. In certain embodiments, the processor 210 may be a central processing unit (CPU), and the computer executable code or instructions being executed by the processor 210 may include an operating system (OS) and other applications, codes or instructions stored in the computing device 200. In certain embodiments, the computing device 200 may run on multiple processors, which may include any suitable number of processors.

The memory 220 may be a volatile memory module, such as the random-access memory (RAM), for storing the data and information during the operation of the computing device 200. In certain embodiments, the memory 220 may be in the form of a volatile memory array. In certain embodiments, the computing device 200 may run on more than one memory 220.

The storage device 230 is a non-volatile storage media or device for storing the computer executable code, such as the OS and the software applications for the computing device 200. Examples of the storage device 230 may include flash memory, memory cards, USB drives, or other types of non-volatile storage devices such as hard drives, floppy disks, optical drives, or any other types of data storage devices. In certain embodiments, the computing device 200 may have more than one storage device 230, and the software applications of the computing device 200 may be stored in the more than one storage device 230 separately.

Figure 2B:
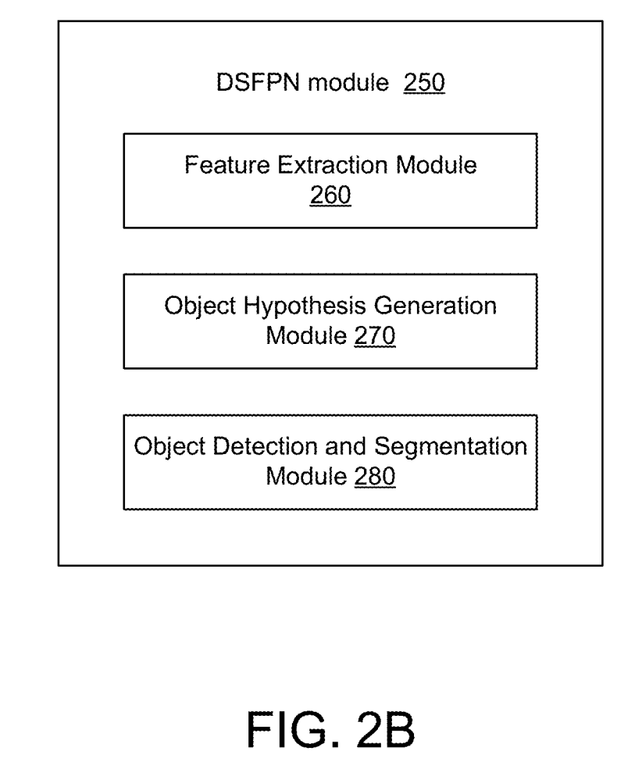
FIG. 2B shows schematically a dually supervised feature pyramid network (DSFPN) module in the computing device as shown in FIG. 2A according to one embodiment of the invention.

As shown in FIG. 2, the computer executable code stored in the storage device 230 may include a DSFPN module 250. Specifically, the DSFPN module 250 is a software module which, when executed, provides a DSFPN system that functions as a deep learning detector to perform object detection. FIG. 2B shows schematically a DSFPN module in the computing device as shown in FIG. 2A according to one embodiment of the invention. Specifically, the DSFPN module 250 as shown in FIG. 2B includes a feature extraction module 260, an object hypothesis generation module 270, and an object detection and segmentation module 280. The feature extraction module 260 is used to provide a set of convolutional networks forming a bottom-up subnet and a top-down subnet, which will be described later; and to generate, by the set of convolutional networks, a plurality of levels of features by an inherent hierarchy from the image frames of the video, which may be captured by the imaging device 120 as shown in FIG. 1. The object hypothesis generation module 270 is used to generate the scale and the location of the object based on the levels of features represented by a plurality of class-agnostic bounding boxes. The object detection and segmentation module 280 is used to predict the categories of the object in the bounding boxes, to refine the scale and the location of the object in the bounding boxes, and to estimate extension of the at least one object. For example, the extension of the object estimated by the object detection and segmentation module 280 may include segmentation of the object.

Figure 3:
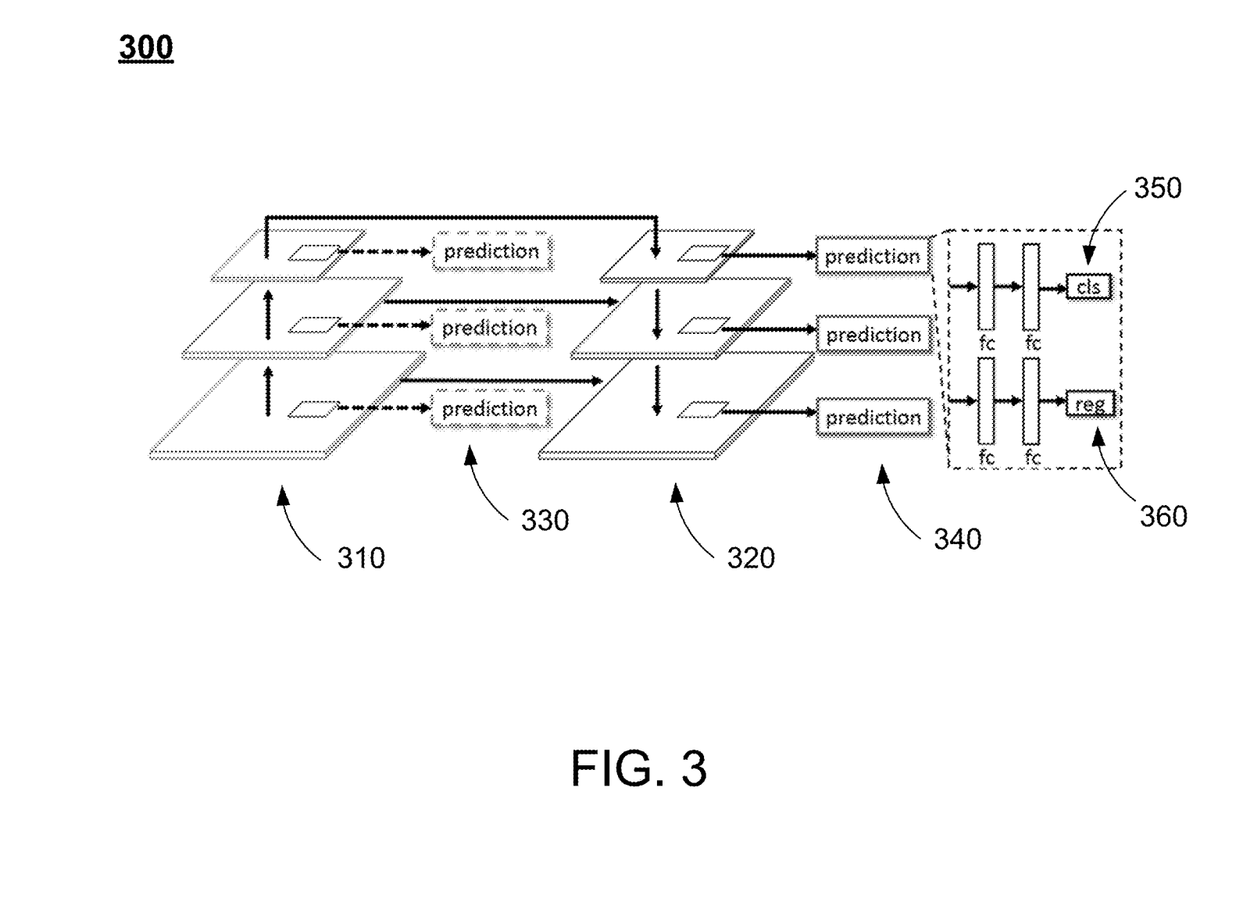
FIG. 3 shows schematically a DSFPN architecture according to one embodiment of the invention.

FIG. 3 shows schematically a DSFPN architecture according to one embodiment of the invention. As shown in FIG. 3, the DSFPN architecture 300 includes a bottom-up subnet 310 and a top-down subnet 320, which is similar to the regular FPN architecture. The bottom-up subnet 310 is a convolutional network, which provides a convolutional feature map for feature extraction, and includes multiple layers. As the process goes up, the spatial resolution decreases. With more high-level structures being detected, the semantic value for each layer increases. The top-down subnet 320 is used to construct higher resolution layers from a semantic rich layer. The reconstructed layers are semantic strong, but the locations of objects are not precise after all the downsampling and upsampling. Thus, lateral connections between the reconstructed layers and the corresponding feature maps, such that the detector may predict the locations of the objects better.

Generally speaking, the DSFPN architecture 300 is proposed to deal with the gradient degradation in the regular FPN for object detection or segmentation at region level during training phase. To this end, in addition to the prediction heads 340 (including object detection and segmentation heads) provided at the top-down subnet 320, when proposals are given, auxiliary prediction heads 330 (also including auxiliary object detection and segmentation heads) are provided at the bottom-up subnet 310, such that supervision signal can immediately direct the feature learning in the bottom-up subnet 310. It should be noted that all prediction heads 340 at the top-down subnet 320 share the same weights. Similarly, all auxiliary prediction heads 330 at the bottom-up subnet 310 share the same weights. In the test phase, these auxiliary heads 330 are discarded, such that no extra computation is needed in the model inference. Further, in the detection task, decoupled classification (cls) heads 350 and regression (reg) heads 360 are generated, and the decoupled cls-reg heads will be described in detail later. Formally, given a set of N proposal boxes $B=\{b_i|i=1, 2, \ldots, N\}$, they are projected to a level of feature layer according to the box size. Using the k-th level as an example, the boxes on the k-th level are $B_k$, and the feature maps of the k-th level are denoted as $f^k$. Thus, the detection and segmentation heads 340 on the top-down subnet 320 can be formulated as $D^k_{td}(f^k_{td}, B_k)$ and $S^k_{td}(f^k_{td}, B_k)$, respectively, where "td" refers to "top-down." Accordingly, the auxiliary prediction heads on the bottom-up subnet 310 include $D^k_{bu}(f^k_{bu}, B_k)$ and $S^k_{bu}(f^k_{bu}, B_k)$, respectively, where "bu" refers to "bottom-up." In the training phase, the predictions over the both pyramid subnets 310 and 320 are $$D=\{D^k_{td}, D^k_{bu} | k=1, 2, \ldots, M\}$$

and $$S=\{S^k_{td}, S^k_{bu} | k=1, 2, \ldots, M\}$$

where M is the number of levels of pyramid. In the inference phase, the predictions are $D=\{D^k_{td} | k=1, 2, \ldots, M\}$ and $S=\{S^k_{td} | k=1, 2, \ldots, M\}$, since the auxiliary prediction heads 330 ($D^k_{bu}$ and $S^k_{bu}$) are removed. The given proposal boxes are not necessary from proposal stage (e.g., RPN), they can also come from latter stages. The effect of choosing the boxes from different stages will be discussed in later. Since the object or segmentation heads over different levels share same weights, the k in each head notation is dropped for simplicity in subsequent sections.

In certain embodiments, the DSFPN architecture 300 as shown in FIG. 3 is general to two-stage and multi-stage detectors. The concrete architecture for the two-stage and multi-stage detectors will be described hereinafter respectively.

Two-Stage Detectors

In certain embodiments, for the two-stage detectors, two representative methods may be implemented, including the Faster Region-based Convolutional Neural Network (Faster R-CNN) and the Mask-R-CNN, for illustration of the process of incorporating dual supervision (DS). Specifically, Faster R-CNN is an object detection algorithm that eliminates the selective search algorithm and lets the network learn the region proposals. Specifically, in the Faster R-CNN algorithm, the image is provided as an input to a convolutional network which provides a convolutional feature map. Instead of using selective search algorithm on the feature map to identify the region proposals, a separate light weight network, such as a region proposal network (RPN), is used to predict the region proposals. The predicted region proposals are then reshaped using a region-of-interest (ROI) pooling layer, which is then used to classify the image within the proposed region and predict the offset values for the bounding boxes. In comparison, Mask R-CNN is a deep neural network which also utilizes two stages to solve instance segmentation problem in machine learning or computer vision. Specifically, in a first stage, proposals about the regions where there might be an object are generated based on the input image frames. Then, the class of the object is predicted, and the bounding boxes are refined to generate a mask in pixel level of the object based on the first stage proposal.

Figure 4:
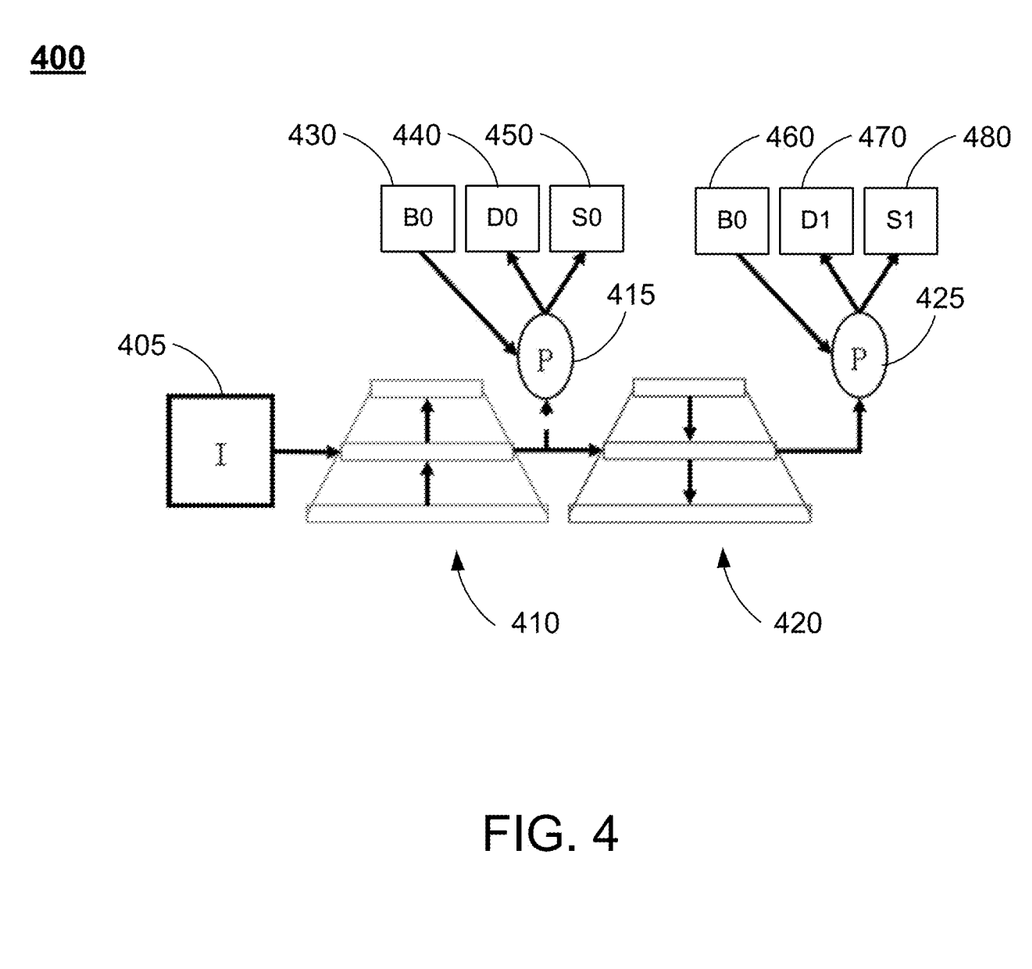
FIG. 4 shows schematically a two-stage DSFPN detector adopting the Faster R-CNN architecture with the DSFPN according to one embodiment of the invention.

FIG. 4 shows schematically a two-stage DSFPN detector adopting the Faster R-CNN architecture with the DSFPN according to one embodiment of the invention. As shown in FIG. 4, the two-stage DSFPN detector 400 includes a bottom-up subnet 410 and a top-down subnet 420. Specifically, the symbol "I" 405 represents the input image frames to the two-stage DSFPN detector 400. The symbol "P" refers to the ROI pooling operations (415 at the bottom-up subnet 410, and 425 at the top-down subnet 420), and the symbols "B," "D" and "S" refer to proposed boxes (430 and 460), detection heads (440 and 470), and segmentation heads (450 and 480), respectively. In operation, the proposal boxes (B0) 430 and 460 are first given and projected to each level of the pyramid. In the Faster R-CNN, B0 is yielded by a region proposal network (RPN), which is not shown in FIG. 4. The auxiliary prediction heads (detection head 440 and segmentation head 450) over the bottom-up subnet 410 are D0 and S0, which correspond to $D_{bu}$ and $S_{bu}$, respectively. The prediction heads (detection head 470 and segmentation head 480) over the top-down subnet 420 are D1 and S1, which correspond to $D_{td}$ and $S_{td}$, respectively. The final loss $L_{final}$ of the two-stage DSFPN detector 400 adopting the Faster R-CNN architecture may be:

$$L_{final}=\alpha_1 L(D_{gt}, D0)+\alpha_2 L(D_{gt}, D1)+\alpha_3 L(S_{gt}, S0)+\alpha_4 L(S_{gt}, S1)$$

where $D_{gt}$ and $S_{gt}$ represent ground truth of corresponding detection and segmentation; $L(D, \cdot)$ and $L(S, \cdot)$ are the detection and segmentation loss functions; and $\alpha_1, \alpha_2, \alpha_3, \alpha_4$ are the weights for each loss. In certain embodiments, the $L(S, \cdot)$ can be omitted when segmentation ground truth is not available.

The specific formulas of the two functions as described above are referred to the Faster R-CNN algorithm. The Mask R-CNN algorithm shares certain similar features to the Faster R-CNN architecture, and details thereof are not further hereinafter elaborated.

Multi-Stage Detectors

Figure 5:
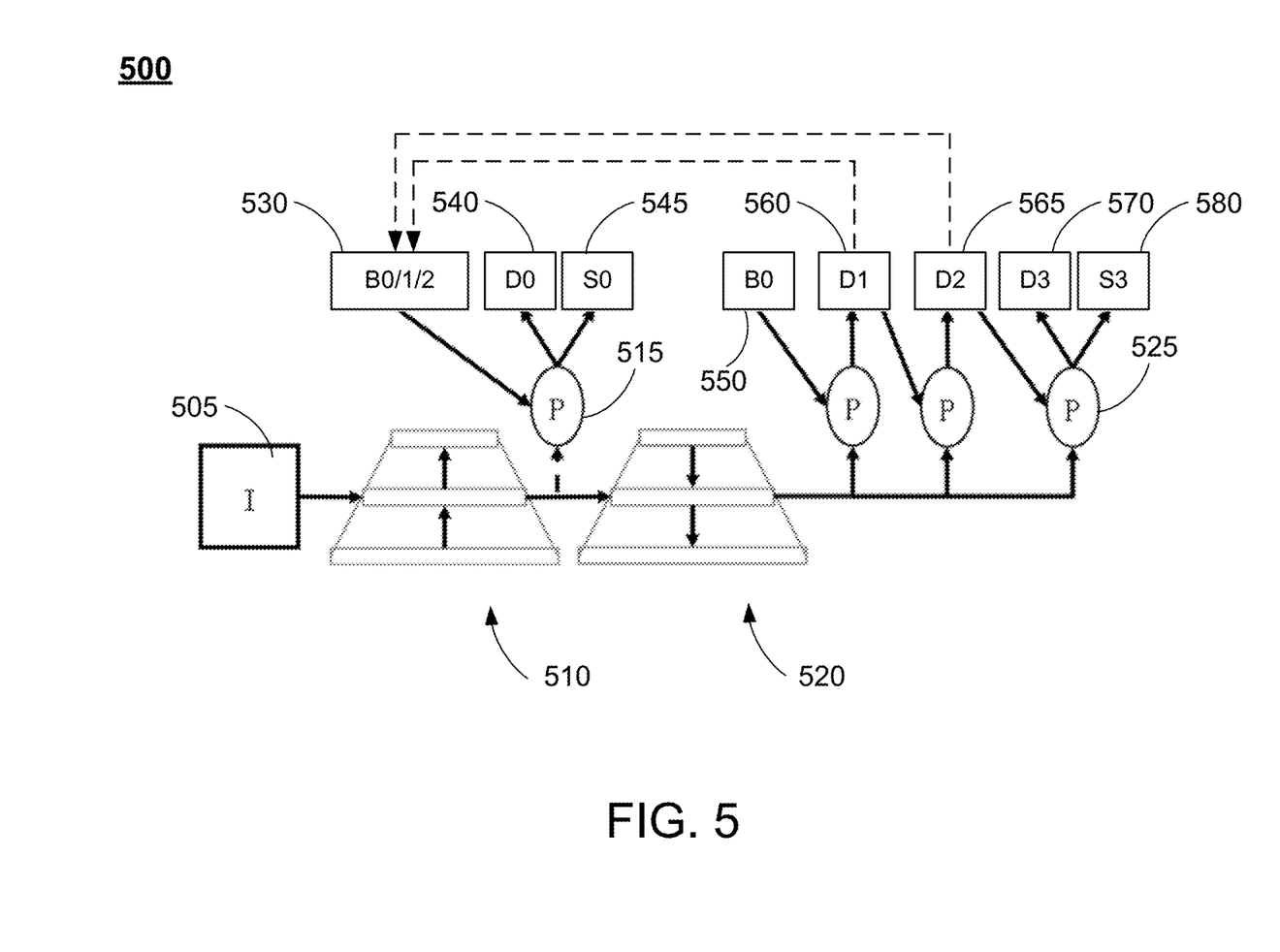
FIG. 5 shows schematically a multi-stage DSFPN detector adopting the Cascade Mask R-CNN architecture with the DSFPN according to one embodiment of the invention.

In certain embodiments, for multi-stage detectors, recently proposed Cascade R-CNN and Cascade Mask R-CNN algorithms may be used to demonstrate how the DS is integrated into the multi-stage detectors. FIG. 5 shows schematically a multi-stage DSFPN detector adopting the Cascade Mask R-CNN architecture with the DSFPN according to one embodiment of the invention. As shown in FIG. 5, the multi-stage DSFPN detector 500 includes a bottom-up subnet 510 and a top-down subnet 520, and the symbols being used in FIG. 5 are similar to those in FIG. 4. Specifically, the symbol "I" 505 represents the input image frames to the multi-stage DSFPN detector 500. The symbol "P" refers to the ROI pooling operations (515 at the bottom-up subnet 510, and 525 at the top-down subnet 520), and the symbols "B," "D" and "S" refer to proposed boxes (530 and 550), detection heads (540, 560, 565 and 570), and segmentation heads (545 and 580), respectively. The proposed boxes can be produced from RPN (B0 in 530 and 550), detection head 560 at the first stage (D1 to B1), and the detection head 565 at the second stage (D2 to B2). In the top-down subnet 520, the proposed boxes 550 can only be B0 produced from the RPN. However, in the bottom-up subnet 510, the boxes 530 can be one of B0 (from the RPN), B1 (from D1) and B2 (from D2). Similar to the two-stage detector 400 as shown in FIG. 4, the predictions over the bottom-up subnet 510 are the detection head 540 (D0) and the segmentation head 545 (S0). However, the predictions over the top-down pyramid are separated into three sets 560 (D1), 565 (D2) and 570 (D3). When the Cascade Mask R-CNN algorithm is used, the segmentation head 580 is simply attached at stage three (S3) for the trade-off between accuracy and computation complexity. Thus, the final loss $L_{final}$ of the multi-stage detector 500 is:

$$L_{final} = \alpha_1 L(D_{gt}, D0) + \alpha_2 L(S_{gt}, S0) + \alpha_3 L(S3_{gt}, S3) + \sum_{i=1}^{T} \alpha_{si} L(Di_{gt}, Di)$$

where i is the index of the prediction stage on the top-down subnet 520; T is the total number of stages; S3 and $S3_{gt}$ are the segmentation predictions at stage three and its corresponding ground truth; Di and $Di_{gt}$ are detections and ground truth at stage i; $L(D, \cdot)$ and $L(S, \cdot)$ are the detection and segmentation loss functions; and $\alpha_1, \alpha_2, \alpha_3, \alpha_{si}$ are weights of each prediction head. The segmentation related terms only exist in Cascade Mask R-CNN, but not in Cascade R-CNN.

Decoupled Head

Figure 6A:
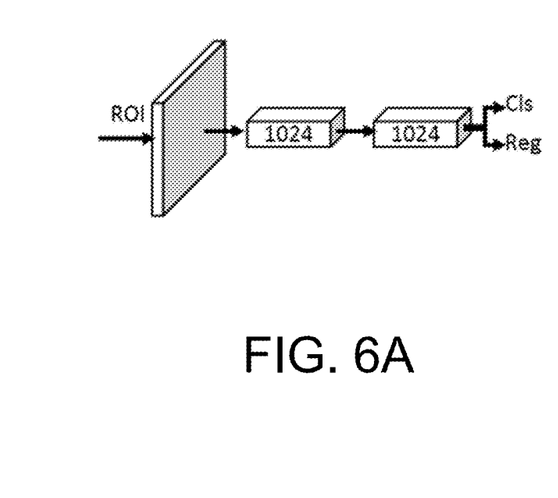
FIG. 6A shows schematically the structure of detection heads in a regular feature pyramid network (FPN) according to one embodiment of the invention.
Figure 6B:
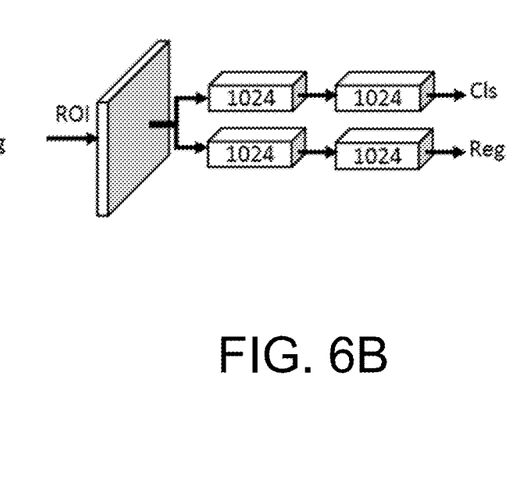
FIG. 6B shows schematically the structure of detection heads in the DSFPN as shown in FIG. 3 according to one embodiment of the invention.

An exemplary comparison of the structure of detection heads in a regular FPN and the structure of detection heads in the DSFPN are shown in FIGS. 6A and 6B. Specifically, for a detection task, the detection heads in the DSFPN architecture include the cls-reg decoupled heads, as shown in FIG. 6B. Compared with the original detection head structure as shown in FIG. 6A, the decoupled head separates the classification and regression tasks in hidden feature space, which is achieved by taking apart the shared two hidden layers with 1,024 nodes. Formally, the detection head is written as $$D(B,f)=C(B,f)+R(B,f)$$

$$C(B,f)=W^2_c \cdot W^1_c \cdot f^B$$

$$R(B,f)=W^2_r \cdot W^1_r \cdot f^B$$

where the symbols C and R symbolize classification and regression, respectively; We and Wr represents the weights of hidden layers of classification and regression, respectively; '1' and '2' denote indices of hidden layers; and $f^B$ is the feature in box regions. This simple operation increases the capacity of the detection heads to address two inconsistent tasks. Moreover, the decoupling disentangles the propagation of supervision signal until the ROI pooling.

In certain embodiments, the apparatus as described above may be used as an object detection system in a vehicle as shown in FIG. 1. As discussed above, the vehicle may be a car, a train, a ship, an aircraft, a shuttle, or other types of vehicles.

Figure 7:
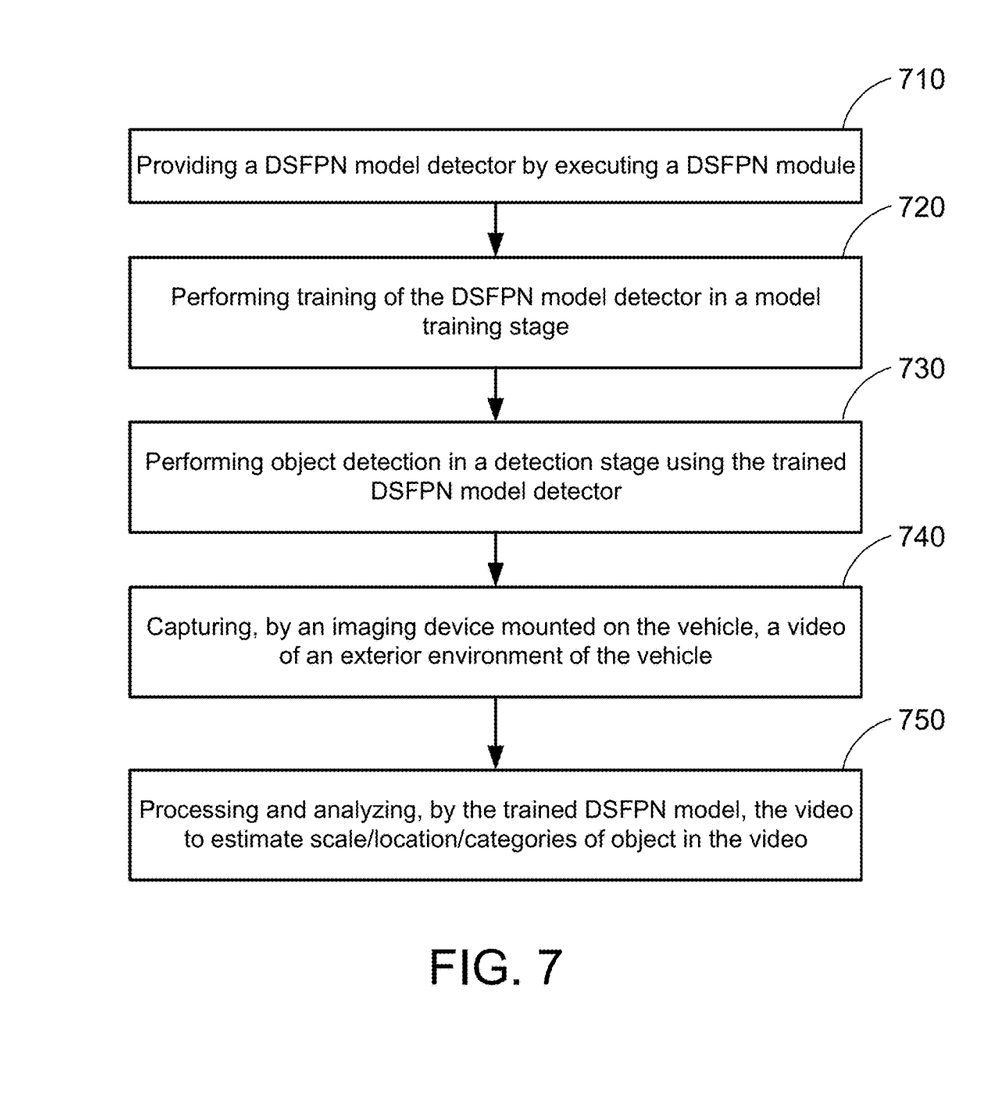
FIG. 7 shows a flowchart of a method for performing object detection around a vehicle according to one embodiment of the invention.

FIG. 7 shows a flowchart of a method for performing object detection around a vehicle according to one embodiment of the invention. In certain embodiments, the method as shown in FIG. 7 may be implemented on a vehicle having the apparatus as shown in FIG. 1, and/or a system as shown in FIGS. 2A and 2B. It should be particularly noted that, unless otherwise stated in the present disclosure, the steps of the method may be arranged in a different sequential order, and are thus not limited to the sequential order as shown in FIG. 7.

As shown in FIG. 7, in the process 710, a DSFPN model detector is provided by executing a DSFPN module on a computing device as shown in FIGS. 2A and 2B. Specifically, the DSFPN model detector may have the architecture as shown in FIG. 3, including a bottom-up subnet provided with a plurality of auxiliary prediction heads, and a top-down subnet provided with a plurality of prediction heads. In the process 720, a training process for the DSFPN model detector is performed in a model training stage, where both the prediction heads and the auxiliary prediction heads are used in the model training stage. Then, in the process 730, the trained DSFPN model is used for performing object detection in a detection stage. Specifically, in the process 740, an imaging device mounted on the vehicle is used to capture a video of an exterior environment of the vehicle. Finally, in the process 750, the trained DSFPN model is used for processing and analyzing the video to estimate a scale, a location and categories of the object in the video, where only the prediction heads are used, and the auxiliary prediction heads are removed in the detection stage.

Yet another aspect of the invention provides a non-transitory tangible computer-readable medium storing instructions which, when executed by one or more processors, cause the above disclosed method for object detection of a vehicle to be performed. The computer executable instructions or program codes enable the above disclosed apparatus or a similar system to complete various operations in accordance with the above disclosed method. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

What is claimed is:

1. An apparatus for object detection around a vehicle, comprising:

an imaging device mounted on the vehicle, configured to capture a video of an exterior environment of the vehicle, wherein the video is formed by a plurality of image frames; and a computing device having a processor and a storage device storing computer executable instructions, wherein the computer executable instructions comprise a dually supervised feature pyramid network (DSFPN) module that, when being executed by the processor, causes the processor to provide a DSFPN model detector to process and analyze the video captured by the imaging device and to estimate a scale, a location and categories of at least one object, wherein the DSFPN model detector comprises a bottom-up subnet provided with a plurality of auxiliary prediction heads, and a top-down subnet provided with a plurality of prediction heads;

wherein the DSFPN model detector is performed in a model training stage and a detection stage, both the prediction heads and the auxiliary prediction heads are used in the model training stage, and the prediction heads are used and the auxiliary prediction heads are removed in the detection stage.

2. The apparatus of claim 1, wherein each of the auxiliary prediction heads and the prediction heads comprise detection heads, and the DSFPN module comprises:
- a feature extraction module, configured to provide a set of convolutional networks forming the bottom-up subnet and the top-down subnet, and to generate, by the set of convolutional networks, a plurality of levels of features by an inherent hierarchy from the image frames of the video;
- an object hypothesis generation module, configured to generate the scale and the location of the at least one object based on the levels of features represented by a plurality of class-agnostic bounding boxes; and
- an object detection and segmentation module, configured to predict the categories of the at least one object in the bounding boxes, to refine the scale and the location of the at least one object in the bounding boxes, and to estimate extension of the at least one object.

3. The apparatus of claim 2, wherein the detection heads of the auxiliary prediction heads are $D^k_{bu}(f^k_{bu}, B_k)$, and the detection heads of the prediction heads are $D^k_{td}(f^k_{td}, B_k)$, wherein $B_k$ represents the bounding boxes of a k-th level of the levels of features, and $f^k$ represents feature maps of the k-th level of the levels of features;

wherein in the model training stage, a predicted detection of the at least one object is:

$$D=\{D^k_{td}, D^k_{bu}|k=1,2\ldots,M\}$$

and in the detection stage, the predicted detection of the at least one object is:

$$D=\{D^k_{td}|k=1,2,\ldots,M\}.$$

4. The apparatus of claim 2, wherein each of the auxiliary prediction heads and the prediction heads further comprise segmentation heads, and the extension of the at least one object estimated by the object detection and segmentation module comprises segmentation of the at least one object.

5. The apparatus of claim 4, wherein the segmentation heads of the auxiliary prediction heads are $S^k_{bu}(f^k_{bu}, B_k)$, and the segmentation heads of the prediction heads are $S^k_{td}(f^k_{td}, B_k)$, wherein $B_k$ represents the bounding boxes of a k-th level of the levels of features, and $f^k$ represents feature maps of the k-th level of the levels of features;

wherein in the model training stage, a predicted segmentation of the at least one object is:

$$S=\{S^k_{td}, S^k_{bu}|k=1,2,\ldots,M\}$$

and in the detection stage, the predicted segmentation of the at least one object is:

$$S=\{S^k_{td}|k=1,2,\ldots,M\}.$$

6. The apparatus of claim 1, wherein the DSFPN model detector is two-stage DSFPN detector configured to adopt a Faster Region-based Convolutional Neural Network (R-CNN) algorithm, and a final loss $L_{final}$ of the two-stage DSFPN detector is:

$$L_{final}=\alpha_1 L(D_{gt}, D0)+\alpha_2 L(D_{gt}, D1)+\alpha_3 L(S_{gt}, S0)+\alpha_4 L(S_{gt}, S1),$$

wherein $D_{gt}$ and $S_{gt}$ represent ground truth of corresponding detection and segmentation, $L(D,\bullet)$ and $L(S,\bullet)$ are detection and segmentation loss functions, and $\alpha_1$, $\alpha_2$, $\alpha_3$, $\alpha_4$ are weights for each loss.

7. The apparatus of claim 1, wherein the DSFPN model detector is multi-stage DSFPN detector configured to adopt a Cascade Region-based Convolutional Neural Network (R-CNN) algorithm, and a final loss $L_{final}$ of the multi-stage DSFPN detector is:

$$L_{final} = \alpha_1 L(D_{gt}, D0) + \alpha_2 L(S_{gt}, S0) + \alpha_3 L(ST_{gt}, ST) + \sum_{i=1}^{T} \alpha_{si} L(Di_{gt}, Di),$$

wherein i represents an index of a plurality of prediction stages on the top-down subnet, T represents a total number of the prediction stages, ST represents segmentation predictions at a last stage of the prediction stages, $ST_{gt}$ represents a corresponding ground truth of the last stage, and its corresponding ground truth; Di represents detections at a stage i of the prediction stages, $Di_{gt}$ represents a corresponding ground truth at the stage i; $L(D,\bullet)$ and $L(S,\bullet)$ are detection and segmentation loss functions; and $\alpha_1$, $\alpha_2$, $\alpha_3$, $\alpha_{si}$ are weights of each prediction head.

8. A vehicle having an object detection system comprising the apparatus of claim 1.

9. A method for performing object detection around a vehicle, comprising:
- providing, by executing a dually supervised feature pyramid network (DSFPN) module on a computing device, a DSFPN model detector, wherein the DSFPN model detector comprises a bottom-up subnet provided with a plurality of auxiliary prediction heads, and a top-down subnet provided with a plurality of prediction heads;
- performing training of the DSFPN model detector in a model training stage, wherein both the prediction heads and the auxiliary prediction heads are used in the model training stage; and
- performing object detection in a detection stage using the trained DSFPN model by:
  - capturing, by an imaging device mounted on the vehicle, a video of an exterior environment of the vehicle; and
  - processing and analyzing, by the trained DSFPN model, the video to estimate a scale, a location and categories of at least one object in the video, wherein the prediction heads are used, and the auxiliary prediction heads are in removed the detection stage.

10. The method of claim 9, wherein each of the auxiliary prediction heads and the prediction heads comprise detection heads, and the DSFPN module comprises:
- a feature extraction module, configured to provide a set of convolutional networks forming the bottom-up subnet and the top-down subnet, and to generate, by the set of convolutional networks, a plurality of levels of features by an inherent hierarchy from the image frames of the video;
- an object hypothesis generation module, configured to generate the scale and the location of the at least one object based on the levels of features represented by a plurality of class-agnostic bounding boxes; and
- an object detection and segmentation module, configured to predict the categories of the at least one object in the bounding boxes, to refine the scale and the location of the at least one object in the bounding boxes, and to estimate extension of the at least one object.

11. The method of claim 10, wherein the detection heads of the auxiliary prediction heads are $D^k_{bu}(f^k_{bu}, B_k)$, and the detection heads of the prediction heads are $D^k_{td}(f^k_{td}, B_k)$, wherein $B_k$ represents the bounding boxes of a k-th level of the levels of features, and $f^k$ represents feature maps of the k-th level of the levels of features;

wherein in the model training stage, a predicted detection of the at least one object is:

$$D=\{D^k_{td},D^k_{bu}|k=1,2,\ldots,M\}$$

and in the detection stage, the predicted detection of the at least one object is:

$$D=\{D^k_{td}|k=1,2,\ldots,M\}.$$

12. The method of claim 10, wherein each of the auxiliary prediction heads and the prediction heads further comprise segmentation heads, and the extension of the at least one object estimated by the object detection and segmentation module comprises segmentation of the at least one object.

13. The method of claim 12, wherein the segmentation heads of the auxiliary prediction heads are $S^k_{bu}(f^k_{bu}, B_k)$, and the segmentation heads of the prediction heads are $S^k_{td}(f^k_{td}, B_k)$, wherein $B_k$ represents the bounding boxes of a k-th level of the levels of features, and $f^k$ represents feature maps of the k-th level of the levels of features;

wherein in the model training stage, a predicted segmentation of the at least one object is:

$$S=\{S^k_{td},S^k_{bu}|k=1,2,\ldots,M\}$$

and in the detection stage, the predicted segmentation of the at least one object is:

$$S=\{S^k_{td}|k=1,2,\ldots,M\}.$$

14. The method of claim 9, wherein the DSFPN model detector is two-stage DSFPN detector configured to adopt a Faster Region-based Convolutional Neural Network (R-CNN) algorithm, and a final loss $L_{final}$ of the two-stage DSFPN detector is:

$$L_{final}=\alpha_1 L(D_{gt},D0)+\alpha_2 L(D_{gt},D1)+\alpha_3 L(S_{gt},S0)+\alpha_4 L(S_{gt},S1),$$

wherein $D_{gt}$ and $S_{gt}$ represent ground truth of corresponding detection and segmentation, $L(D,\bullet)$ and $L(S,\bullet)$ are detection and segmentation loss functions, and $\alpha_1$, $\alpha_2$, $\alpha_3$, $\alpha_4$ are weights for each loss.

15. The method of claim 9, wherein the DSFPN model detector is multi-stage DSFPN detector configured to adopt a Cascade Region-based Convolutional Neural Network (R-CNN) algorithm, and a final loss $L_{final}$ of the multi-stage DSFPN detector is:

$$L_{final} = \alpha_1 L(D_{gt}, D0) + \alpha_2 L(S_{gt}, S0) + \alpha_3 L(ST_{gt}, ST) + \sum_{i=1}^{T} \alpha_{si} L(Di_{gt}, Di),$$

wherein i represents an index of a plurality of prediction stages on the top-down subnet, T represents a total number of the prediction stages, ST represents segmentation predictions at a last stage of the prediction stages, $ST_{gt}$ represents a corresponding ground truth of the last stage, and its corresponding ground truth; Di represents detections at a stage i of the prediction stages, $Di_{gt}$ represents a corresponding ground truth at the stage i; $L(D,\bullet)$ and $L(S,\bullet)$ are detection and segmentation loss functions; and $\alpha_1$, $\alpha_2$, $\alpha_3$, $\alpha_{si}$ are weights of each prediction head.

16. A non-transitory tangible computer-readable medium storing computer executable instructions which, when executed by one or more processors, cause a method for performing object detection around a vehicle to be performed, the method comprising:

providing a dually supervised feature pyramid network (DSFPN) model detector, wherein the DSFPN model detector comprises a bottom-up subnet provided with a plurality of auxiliary prediction heads, and a top-down subnet provided with a plurality of prediction heads;

performing training of the DSFPN model detector in a model training stage, wherein both the prediction heads and the auxiliary prediction heads are used in the model training stage; and performing object detection in a detection stage using the trained DSFPN model by:

capturing, by an imaging device mounted on the vehicle, a video of an exterior environment of the vehicle; and processing and analyzing, by the trained DSFPN model, the video to estimate a scale, a location and categories of at least one object in the video, wherein the prediction heads are used, and the auxiliary prediction heads are removed in the detection stage.

17. The non-transitory tangible computer-readable medium of claim 16, wherein each of the auxiliary prediction heads and the prediction heads comprise detection heads, and the computer executable instructions comprises a DSFPN module comprising:

a feature extraction module, configured to provide a set of convolutional networks forming the bottom-up subnet and the top-down subnet, and to generate, by the set of convolutional networks, a plurality of levels of features by an inherent hierarchy from the image frames of the video;

an object hypothesis generation module, configured to generate the scale and the location of the at least one object based on the levels of features represented by a plurality of class-agnostic bounding boxes; and an object detection and segmentation module, configured to predict the categories of the at least one object in the bounding boxes, to refine the scale and the location of the at least one object in the bounding boxes, and to estimate extension of the at least one object.

18. The non-transitory tangible computer-readable medium of claim 17, wherein the detection heads of the auxiliary prediction heads are $D^k_{bu}(f^k_{bu}, B_k)$, and the detection heads of the prediction heads are $D^k_{td}(f^k_{td}, B_k)$, wherein $B_k$ represents the bounding boxes of a k-th level of the levels of features, and $f^k$ represents feature maps of the k-th level of the levels of features;

wherein in the model training stage, a predicted detection of the at least one object is:

$$D=\{D^k_{td},D^k_{bu}|k=1,2,\ldots,M\}$$

and in the detection stage, the predicted detection of the at least one object is:

$$D=\{D^k_{td}|k=1,2,\ldots,M\}.$$

19. The non-transitory tangible computer-readable medium of claim 17, wherein each of the auxiliary prediction heads and the prediction heads further comprise segmentation heads, and the extension of the at least one object estimated by the object detection and segmentation module comprises segmentation of the at least one object.

20. The non-transitory tangible computer-readable medium of claim 19, wherein the segmentation heads of the auxiliary prediction heads are $S^k_{bu}(f^k_{bu}, B_k)$, and the segmentation heads of the prediction heads are $S^k_{td}(f^k_{td}, B_k)$, wherein $B_k$ represents the bounding boxes of a k-th level of the levels of features, and $f^k$ represents feature maps of the k-th level of the levels of features;

wherein in the model training stage, a predicted segmentation of the at least one object is:

$S=\{S^k_{td}, S^k_{bu}|k=1,2,\ldots,M\}$ and in the detection stage, the predicted segmentation of the at least one object is:

$S=\{S^k_{td}|k=1,2,\ldots,M\}$.

\* \* \* \* \*